United States Patent
Binelli

(10) Patent No.: US 8,091,237 B2
(45) Date of Patent: Jan. 10, 2012

(54) METHOD FOR MAKING A VEHICLE SEAT CROSSMEMBER

(75) Inventor: James C. Binelli, Grand Blanc, MI (US)

(73) Assignee: Lear Corporation, Southfield, MI (US)

( * ) Notice: Subject to any disclaimer, the term of this patent is extended or adjusted under 35 U.S.C. 154(b) by 1761 days.

(21) Appl. No.: 10/910,120

(22) Filed: Aug. 3, 2004

(65) Prior Publication Data

US 2006/0026837 A1    Feb. 9, 2006

(51) Int. Cl.
*B21D 53/88* (2006.01)
*A47C 7/02* (2006.01)

(52) U.S. Cl. ............ 29/897.2; 29/432.2; 29/432.1; 29/432; 29/DIG. 32; 297/452.18; 297/452.2; 72/51

(58) Field of Classification Search ........... 29/897.2, 29/432, 432.1, 432.2, 464, 469.5, 524.1, 29/557, DIG. 32, DIG. 37, DIG. 48; 297/452.18, 297/452.2; 72/51, 52
See application file for complete search history.

(56) References Cited

U.S. PATENT DOCUMENTS

| | | | |
|---|---|---|---|
| 3,204,325 A * | 9/1965 | Ernestus ............... 29/897.2 |
| 3,209,432 A * | 10/1965 | Cape ................... 29/897.2 |
| 4,301,348 A * | 11/1981 | Nakazima ............. 219/61.2 |
| 4,310,740 A * | 1/1982 | Nakazima ............ 219/61.11 |
| 4,690,599 A * | 9/1987 | Shinjo ................. 411/180 |
| 5,163,603 A * | 11/1992 | Richart ................ 228/141.1 |
| 5,169,055 A * | 12/1992 | Peterson et al. ......... 228/170 |
| 5,207,588 A * | 5/1993 | Ladouceur et al. ...... 439/84 |
| 5,243,842 A * | 9/1993 | Kobayashi et al. ........ 72/51 |
| 5,249,841 A * | 10/1993 | Chales ................ 297/452.18 |
| 5,288,134 A | 2/1994 | Hewko et al. .......... 297/344.1 |
| 5,382,083 A | 1/1995 | Fecteau et al. ......... 297/452.2 |
| 5,412,860 A * | 5/1995 | Miyauchi et al. ....... 29/527.1 |
| 5,802,903 A * | 9/1998 | Nakajima ............... 72/224 |
| 6,189,975 B1 * | 2/2001 | Okazaki et al. ......... 297/452.18 |
| 6,223,436 B1 * | 5/2001 | Dudash et al. .......... 29/897.2 |
| 6,338,191 B1 * | 1/2002 | Petersen ................ 29/523 |
| 6,352,311 B1 | 3/2002 | Hayotte ................ 297/452.2 |
| 6,375,268 B2 * | 4/2002 | Okazaki et al. ......... 297/452.18 |
| 6,601,427 B2 * | 8/2003 | Kondou et al. ........... 72/368 |
| 6,643,931 B2 * | 11/2003 | Nees .................. 29/897.312 |
| 6,709,061 B2 * | 3/2004 | McWhinnie et al. ..... 297/452.18 |
| 6,792,681 B2 * | 9/2004 | Fader et al. ............ 29/897.2 |

(Continued)

FOREIGN PATENT DOCUMENTS

DE    198 18 234 A1    10/1999

(Continued)

*Primary Examiner* — Essama Omgba
(74) *Attorney, Agent, or Firm* — Bliss McGlynn, P.C.

(57) ABSTRACT

A method for producing a rear crossmember for a vehicle seat that includes the steps of providing metal plate stock having a first edge and a second edge as well as performing a simultaneous punching and clinching operation to locate and secure a plurality of threaded fasteners into the plate stock at predetermined points. This operation causes an opening to be punched through the plate stock and the fasteners to be permanently retained in the plate stock at the openings. The plurality of fasteners provide threaded connection points that are employed in the further construction of the vehicle seat. A rolling operation is employed to cause the first edge of the plate stock to come into close proximity with the second edge of the plate stock in such a manner as to form the desired cross-sectional shape for the rear crossmember and a welding operation used to secure the first edge to the second edge thereby forming the rolled plate stock into the desired rear crossmember.

6 Claims, 4 Drawing Sheets

U.S. PATENT DOCUMENTS

| | | | |
|---|---|---|---|
| 7,134,456 B2 * | 11/2006 | Maeda et al. | 138/156 |
| 7,134,729 B2 * | 11/2006 | Dowty et al. | 297/452.18 |
| 7,716,797 B2 * | 5/2010 | Kismarton et al. | 29/91.1 |
| 2003/0101566 A1 * | 6/2003 | Ladouceur | 29/432.2 |
| 2008/0150342 A1 * | 6/2008 | Kismarton et al. | 297/452.18 |
| 2010/0187894 A1 * | 7/2010 | Kismarton et al. | 297/452.18 |
| 2010/0187895 A1 * | 7/2010 | Kismarton et al. | 297/452.18 |

FOREIGN PATENT DOCUMENTS

| | | |
|---|---|---|
| DE | 101 60 352 C1 | 6/2003 |
| GB | 221859 | 9/1924 |
| JP | 57048440 A * | 3/1982 |
| JP | 06217844 A * | 8/1994 |

* cited by examiner

METHOD FOR MAKING A VEHICLE SEAT CROSSMEMBER

BACKGROUND OF THE INVENTION

1. Field of the Invention

The present invention relates, generally, to a method of making a vehicle seat and, more specifically, to a method of making a vehicle seat crossmember.

2. Description of the Related Art

Seats for motor vehicles are well known and produced in a wide variety of styles and types. Seat construction also varies widely. For example, it is common to provide a one-piece seat pan to support the lower seat cushion structure of the bottom of a vehicle seat. This is particularly true with sport utility and smaller sized vehicles that employ separate or bucket-style front seating arrangements. However, in larger vehicles and in vehicles with wider seat construction, a more substantial frame consisting of several elements is employed to support the larger lower seat cushion. These multi-piece seat frames are also employed for mid and/or rear vehicle seating arrangements where the seat spans the vehicle or is split to fold in portions.

Due to economic factors, vehicle and vehicle seat manufacturers are constantly under pressure to reduce the weight of vehicle seats while maintaining their structural strength. Production and manufacturing costs are also scrutinized. Lighter weight materials in the vehicle seat can lower the cost of manufacturing by reducing the amount of materials used, and generally lower the operating expense of the vehicle by contributing toward improving the gas mileage. On the other hand, more efficient production methods also provide cost savings. More specifically, cost savings can be realized if the number of production or process steps are reduced or if a process can be re-engineered so that less human intervention and a greater number of machine controlled operations are utilized instead.

In a multi-piece seat frame, the rear crossmember is generally key to providing the majority of structural integrity for the entire seat. The rear crossmember must not only support the lower seat cushion but also the seat back as well. Often, the seat is secured to the floor by the rear crossmember such that the rear crossmember also takes on the seat belt loading in an emergency situation. In conventional multi-piece vehicle seats, the rear crossmember tends to be a heavy and generally complex element. Rear crossmembers are constructed of two or more pieces that are separately stamped and then welded together. Conventional rear crossmembers must also have openings cut and fasteners installed that are later used during seat build up and installation of the seat assembly in the vehicle. The placement and securing of the fasteners in the conventional crossmembers requires that nuts be placed and welded individually on the inside of one of the stamped sections before the rear crossmember is assembled. Thus, current construction methods require a considerable number of steps and separate processes to arrive at the completed rear crossmember. Additionally, a number of these steps require human intervention and control to produce this product. The large number of production steps as well as the requirement for human intervention makes these components expensive and time consuming to produce Thus, there remains a need in the art for a process that produces a lightweight, yet strong, single piece rear crossmember for a vehicle seat that is economical to produce and does not require human intervention during the manufacturing process.

SUMMARY OF THE INVENTION

The disadvantages of the related art are overcome by the method of the present invention for producing a rear crossmember for a vehicle seat that includes the steps of providing metal plate stock having a shape generally consistent with the rear crossmember to be produced that has a first edge and a second edge and performing a simultaneous punching and clinching operation to locate and secure a plurality of threaded fasteners into the plate stock at predetermined points. The simultaneous punching and clinching operations causes an opening to be punched through the plate stock and further causes the fasteners to be permanently retained in the plate stock at the openings such that the plurality of fasteners provide threaded connection points that are employed in the further construction of the vehicle seat. The method also provides the steps of performing a rolling operation to cause the first edge of the plate stock to come into close proximity with the second edge of the plate stock in such a manner as to form the desired cross-sectional shape for the rear crossmember, and performing a welding operation to secure the first edge to the second edge thereby forming the rolled plate stock into the desired rear crossmember.

In this way, the method of the present invention overcomes the drawbacks and deficiencies of conventional crossmembers and their construction methods. The method of the present invention produces a strong, lightweight, single piece rear crossmember for a vehicle seat in a simplified, cost effective, and efficient manner, by a process that is automated and eliminates the need for any human intervention during in the manufacturing process.

Other objects, features and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
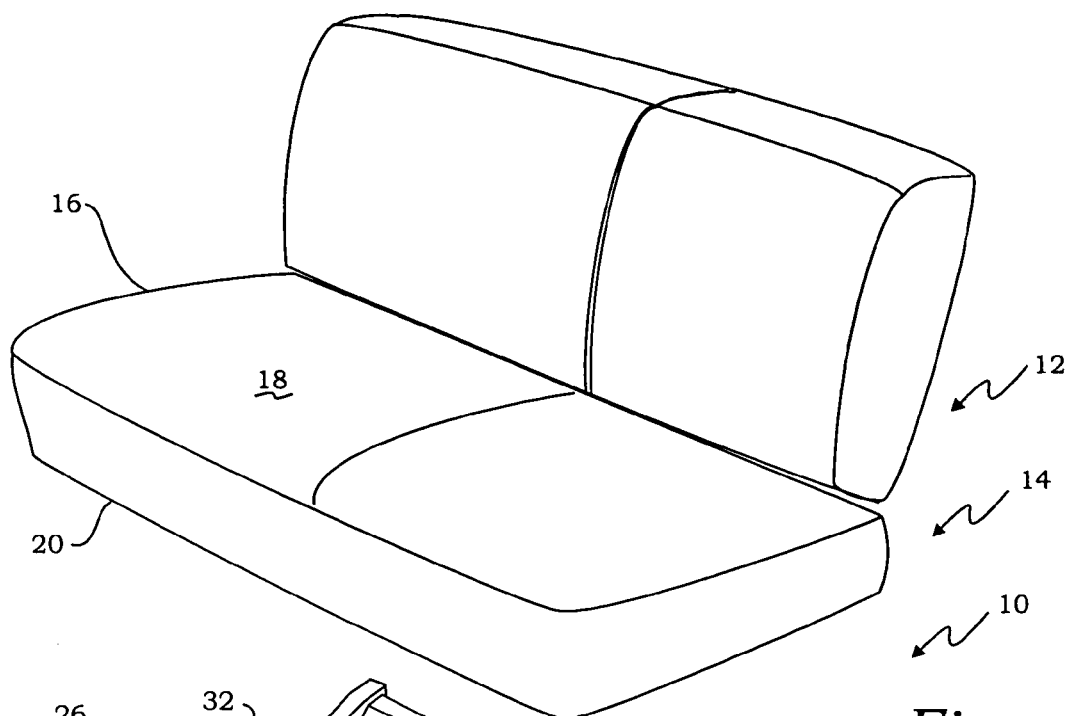
FIG. 1 is a partial perspective view showing a vehicle seat employing a rear crossmember of the type produced by the method of the present invention.

A vehicle seat assembly having a rear crossmember manufactured pursuant to the method of the present invention is generally indicated as 10 in FIG. 1, where like numerals are used to designate like structure throughout the figures. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

To support the weight of the occupant, the lower seat assembly 14 also includes a multi-piece lower seat frame, generally indicated at 26. The lower seat frame 26 is generally disposed beneath the lower surface 18 so as to support the seat cushion 16. In turn, the lower seat frame 26 is operatively supported relative to the floor of the vehicle using any suitable structure of the type commonly known in the art, such as a seat track (not shown). In the embodiment illustrated here, the lower seat frame 26 further includes a front crossmember 28 and a rear crossmember 30 with side support members 32 extending therebetween. It should be appreciated that any of a variety of different structural support members may be operatively disposed between the front and rear members 28 and 30 to support the seat cushion 16. However, as illustrated herein and by way of non-limiting example, wire grid supports 34 are operatively supported between the front and rear crossmembers 28 and 30 by spring members 36. The wire grid supports 34 and the spring members 36 act to directly support the seat cushion 16. In the embodiment illustrated in FIG. 1, the lower seat assembly 14 is generally large enough to be employed in a split seat arrangement that would likely provide seating for more than one occupant. With this configuration in mind, an intermediate support bar 39 is also employed that is disposed parallel to the side support members 32 between the front and rear crossmembers 28 and 30 to provide additional support.

As noted above, in a multi-piece lower seat assembly, such as illustrated here, the rear crossmember 30 is key to providing the majority of structural integrity for the entire seat. The rear crossmember 30 must not only support the majority of weight placed upon the lower seat assembly 14 but also must support the seat back 12 as well. When installed in the vehicle, the seat assembly 10 is secured to the floor (or a movable track system that is secured to the floor) through the front and rear crossmembers 28 and 30. Thus, as will be discussed below, the rear crossmember 30 must include mounting points for attachment to the seat tracks, mounting points for the spring members 36, and other support and attachment openings.

Figure 2:
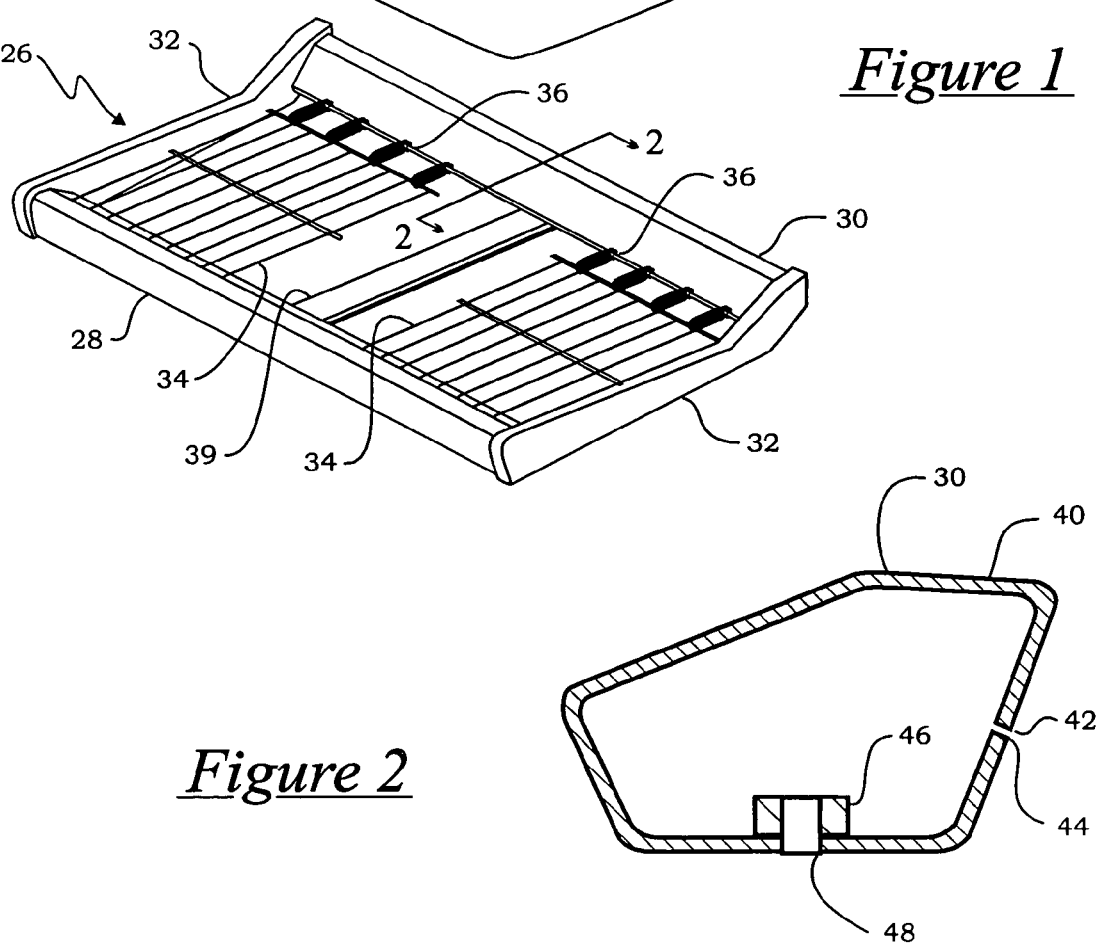
FIG. 2 is a cross-sectional side view of a rear crossmember of the type produced by the method of the present invention.

In conventional multi-piece vehicle seats, the rear crossmember tends to be a heavy and generally complex element that is constructed of two or more pieces that are separately stamped and then welded together. Current construction methods require a considerable number of steps and separate processes to arrive at the completed rear crossmember. Additionally, a number of these steps require human intervention and control to produce this product. However, as shown in the figures, the method of the present invention provides a single piece, roll formed rear crossmember 30 that overcomes the limitations and drawbacks of conventional rear crossmembers. FIG. 2 illustrates the cross-section of the roll-formed rear crossmember 30 produced by the method of the present invention as will be discussed below.

Figure 3:
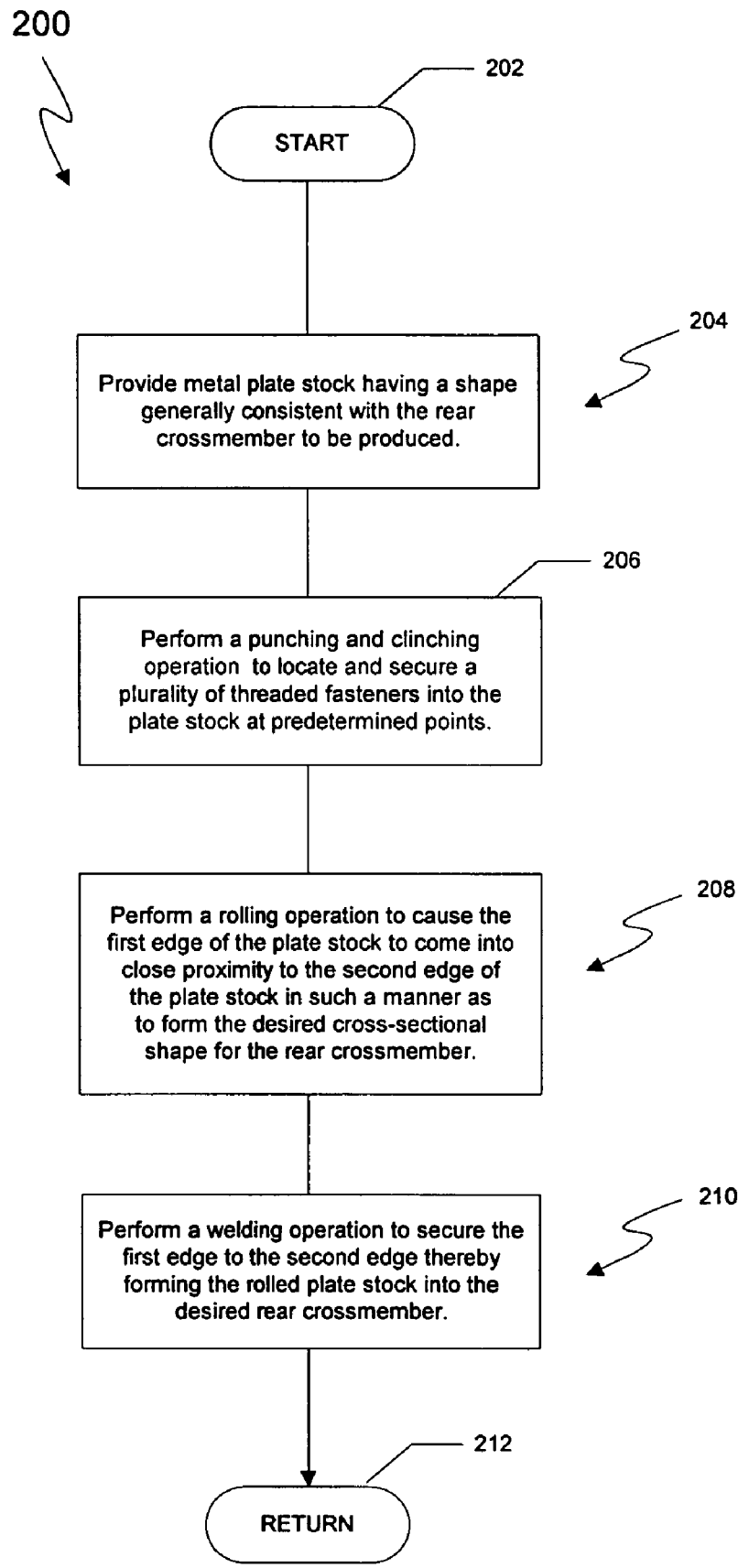
FIG. 3 is a general block diagram flowchart illustrating the method of the present invention.

The method of the present invention is generally indicated at 200 in FIG. 3 and is employed to produce the single piece, roll formed rear crossmember 30. The method begins at the start entry block 202, which is indicative of some manor of initiation of the process. It should be appreciated that the overall method may stand-alone or be part or subsystem of a larger manufacturing process or system. In that regard, the start entry block may be a command initiated by an electronic control system or simply by powering up of the mechanical devices described below. The first process block generally indicated at 204 represents the first process step of the method of the present invention and provides metal plate stock having a shape generally consistent with the rear crossmember to be produced. The plate stock further defined as having a first edge and a second edge. It should be appreciated that, by nature, the metal plate stock is generally flat and has sufficient size to produce the desired cross-sectional shape of the rear crossmember when roll formed. Specifically referring to FIG. 2, the completed roll-formed rear crossmember 30 is formed of plate stock 40 that has a first edge 42 and a second edge 44.

Referring again to FIG. 3, at process block 206 a punching and clinching operation is performing to locate and secure a plurality of threaded fasteners into the plate stock at predetermined points. This operation is performed mechanically and causes an opening to be punched through the plate stock and then further causes the fasteners to be permanently retained in the plate stock above the openings. For example, it should be appreciated that the fasteners may be male threaded fasteners that are inserted through openings that are punched in the plate stock and then are mechanically retained there. Furthermore, it should be appreciated that this operation may be performed in two separate events. However, in the preferred embodiment, a simultaneous punching and clinching operation is performed. As shown in FIG. 2, the fasteners may include female self-clinching nuts 46 that have a piercing sleeve 48. During the operation the piercing sleeve 48 is driven through the plate stock 40. An opposing die causes the fastener to be clinched in the plate stock 40 and permanently retained. Thus, the plurality of fasteners 46 provide threaded connection points through the plate stock 40 that are employed in the further construction of the vehicle seat. While female self-clinching nuts are illustrated in FIG. 2, those having ordinary skill in the art will appreciate that any type of fastener may be employed that is capable of providing an opening in the plate stock and then being mechanically retained above the opening.

The next process block generally indicated at 208 in FIG. 3 includes a rolling operation that is performed to cause the first edge 42 of the plate stock 40 to come into close proximity to the second edge 44 of the plate stock 40 in such a manner as to form the desired cross-sectional shape for the rear crossmember 30 (FIG. 2). Once the plate stock with the fasteners 46 mounted therein is rolled into the desired form, a welding operation that is generally indicated at process block 210 is performed to secure the first edge 42 to the second edge 44 thereby forming the rolled plate stock into the desired rear crossmember 30. It should be appreciated that the rolling operation may provide an abutting relationship between the first and second edges 42, 44 or may cause either of the edges to overlap the other. The return block 212 indicates a completion of the method steps and allows for return to the beginning of the process so that additional rear crossmembers 30 may be produced.

Figure 4:
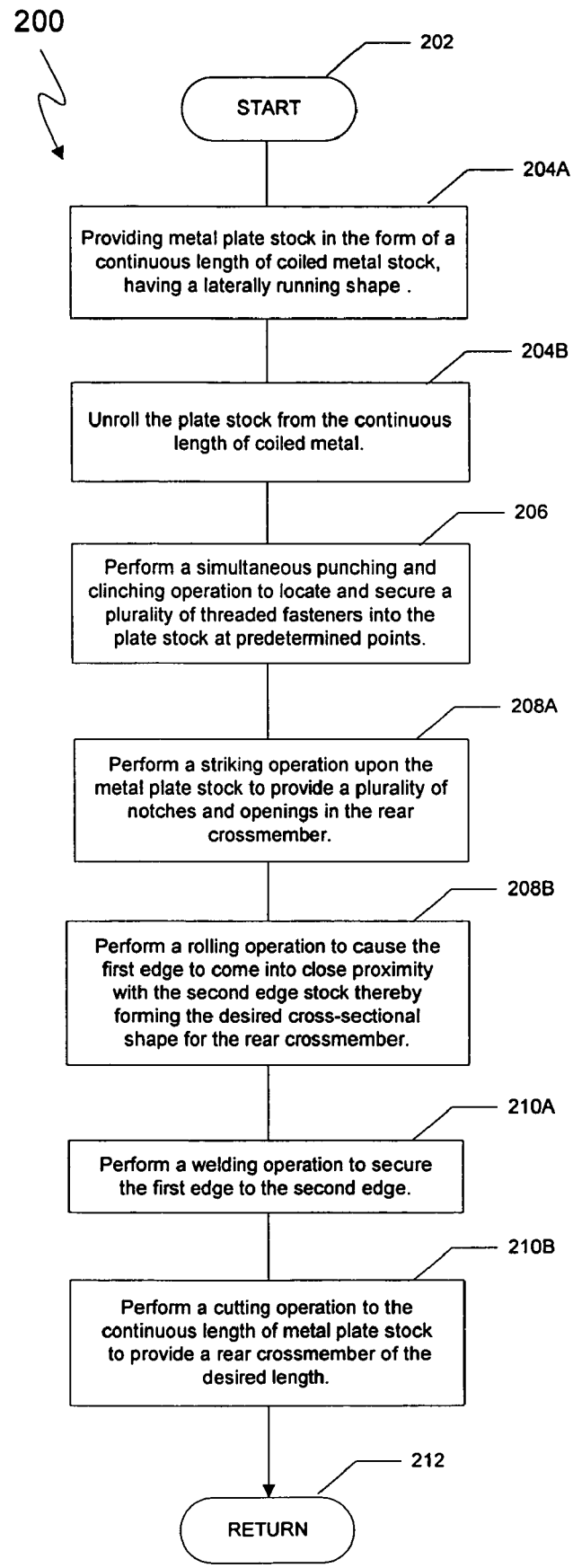
FIG. 4 is a detailed block diagram flowchart illustrating the method of the present invention.

It should be appreciated that the general process steps in FIG. 3 may include additional steps to provide automation and enhanced speed to the process. More specifically, and by way of non-limiting example, the method steps indicated in FIG. 3 may include additional steps as those depicted in detail in FIG. 4. In this regard, FIG. 4 is described with reference to FIG. 5, which graphically represents an automated, continuously operative process that employs a press/stamping device and a rolling device fed by a roll of coiled metal stock to produce the rear crossmember 30. The method of the present invention is generally indicated at 200 in FIG. 4 and is employed to produce the single piece, roll formed rear crossmember 30. The method begins at the start entry block 202, which as previously mentioned, is indicative of some manner of initiation of the process. As noted above, it should be appreciated that the overall method may stand alone or be part or subsystem of a larger manufacturing process or system. Process block 204 of FIG. 3 is automated by the process steps 204A and 204B indicated in FIG. 4. Process step 204A provides metal plate stock in the form of a continuous length of coiled metal stock, generally consistent with the rear crossmember to be produced. The plate stock is further defined as having a first edge and a second edge.

Figure 5:
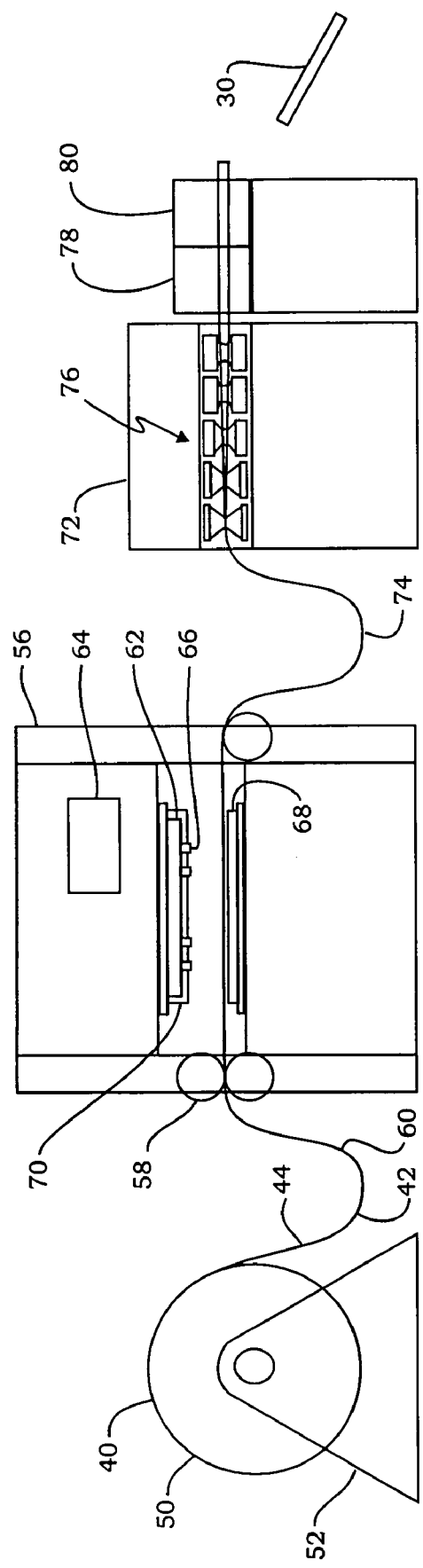
FIG. 5 is a schematic illustration of one example of a group of process devices that may be utilized to perform the method of the present invention.

As best shown in FIG. 5, the metal plate stock 40 is initially provided in a coil 50 that is supported on a spool 52. As indicated in process block 204B of FIG. 4, the plate stock 40 is unrolled from the continuous length of coiled metal for delivery to the press/stamping device (56 in FIG. 5). It should be appreciated that, generally speaking, the delivery of the metal plate stock 40 to the press/stamping device 56 is driven by some manner of feed rollers 58 that may or may not be directly incorporated into the press/stamping device 56. The delivery of the metal plate stock 40 is also controlled to some extent by operatively driving the spool 52 toward the press/stamping device 56. As will be discussed below, a length of plate stock 40 that will become the length of the rear crossmember 30 is fed into the press/stamping device 56 at one time, as opposed to a continuously moving feed of plate stock 40. To allow for the unhampered periodic feeding of a specific length of plate stock 40 into the press/stamping device 56, a loop 60 of metal plate is maintained between the spool 52 and the press/stamping device 56. With continuing reference to FIG. 5, as previously mentioned, the metal plate stock 40 as unrolled from the coil 50 has a first edge 42 and a second edge 44. In the elevation view of FIG. 5, the first edge 42 is the running edge oriented toward the viewer and the second edge 44 is the running edge oriented away from the viewer.

Referring back to FIG. 4, the method steps continue with process block 208, which performs a simultaneous punching and clinching operation to locate and secure a plurality of threaded fasteners 46 into the plate stock 40 at predetermined points. The mechanical design of the press/stamping device 56 (FIG. 5) is such that in a single operation, the metal plate stock 40 is flattened and a plurality of fasteners 46 are attached. More specifically, the press/stamping device 56 shown in FIG. 5 employs a pressing die 62 that incorporates a fastener tool 64. The fastener tool 64 further includes fastener dies 66 that are disposed at predetermined positions in the pressing die 62. As the metal plate stock 40 is fed into the press/stamping device 56, the pressing die 62 is held above the plate stock 40. However, as noted above, those having ordinary skill in the art will appreciate that any of a variety of fasteners may be employed that is capable of providing an opening in the plate stock and then being mechanically retained above the opening.

The fastener tool 64 preloads a plurality of self-clinching fasteners 46 into the fastener dies 66 at the predetermined positions over the plate stock 40. In the preferred embodiment, the fasteners 46 are female self-clinching nuts that each have a piercing sleeve 48 that is held over the plate stock 40. When the pressing die 62 is driven downward, it bears down upon the plate stock 40 ensuring that it is flat and held in place as the piercing sleeves 48 of the fasteners 46 puncture the plate stock 40. The underlying and opposing portion of the pressing die 68 causes the fasteners 46 to be clinched into the plate stock 40 and remain permanently retained.

The method steps continue, and the process step indicated at 208 in FIG. 3 may be automated by the process steps 208A and 208B as indicated in FIG. 4. Process step 208A performs a striking operation upon the metal plate stock 40 to provide a plurality of notches and openings in the rear crossmember, which are employed in the further construction of the vehicle seat. As previously discussed, the rear crossmember 30 must have attachment openings for the spring members 36 and other various notches and openings to provide connection points when the seat is constructed. Thus, a stamping die 70 is brought down onto the plate stock 40 and punches out the necessary openings with a single strike. Process block 208B then continues by performing a rolling operation to cause the first edge 42 of the plate stock 40 to come into close proximity with the second edge 44 of the plate stock 40 thereby forming the desired cross-sectional shape for the rear crossmember (FIG. 2). The rolling operation is accomplished as illustrated in FIG. 5 by the rolling mill 72.

More specifically, the metal plate stock 40 that now has the fasteners 46 attached and the other required openings and notches punched is fed into rolling mill 72 from the press/stamping device 56. A loop 74 is maintained in the feed of plate stock 40 to the rolling mill 72 to allow for the difference in the continuous feed into the rolling mill 72 as opposed to the movement of a full length of rear crossmember out of the press/stamping device 56. The rolling mill 72 includes a series of graduated rollers, generally indicated at 76 that takes the flat incoming plate stock 40 and rolls it into the desired cross-sectional shape of the rear crossmember 30 (FIG. 2). It should be appreciated that the rolling operation may provide an abutting relationship between the first and second edge 42, 44 of the plate stock 40 or it may cause either of the edges to overlap the other.

The method steps continue with process blocks 210A and 210B in FIG. 4. Process block 210A first performs a welding operation to secure the first edge 42 to the second edge 44, and then process block 316 performs a cutting operation to the continuous length of metal plate stock 40 that is now formed into a continuous rear crossmember to provide a rear crossmember 30 of the desired length. As illustrated in FIG. 5, the welding operation may be performed at the end of the rolling mill 72 by a laser welding, or like device 78, so that a cutting operation may be performed immediately after welding by a cutting device 80. The cutting operation may be performed with any variety of cutting mechanisms such as a shear, a saw, or a disc-cutting device. After these operations are performed, the completed rear crossmember 30 is ejected from the process.

It should be appreciated that depending upon the physical setup of the devices used to produce the rear crossmember 30, the welding and cutting operations may be performed by devices directly attached or associated with the rolling mill 72 or they may be physically separate devices. It should be further appreciated that the cutting operation may be alternately performed in the process steps prior to the welding operation. Similarly, the step of cutting the continuous length of metal stock 40 may also be performed prior to the simultaneous punching and clinching operation. The return block 316 indicates a completion of the method steps and allows for return to the beginning of the process so that additional rear crossmembers 30 may be produced.

In this way, the method of the present invention for producing a rear crossmember for a vehicle seat overcomes the drawbacks and deficiencies of conventional crossmembers and their construction methods. In a simplified, cost effective, and efficient manner, the method of the present invention produces a strong, lightweight, single piece rear crossmember for a vehicle seat by a process that is automated and eliminates the need for any human intervention during in the manufacturing process.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

I claim:

1. A method for producing a rear crossmember for a vehicle seat including the steps of:
   providing metal plate stock having a shape generally consistent with the rear crossmember to be produced, the plate stock further defined as having a first edge and a second edge;
   performing a simultaneous punching and clinching operation to locate and secure a plurality of threaded fasteners into the plate stock at predetermined points, said operation causing an opening to be punched through the plate stock and further causing the fasteners to be permanently retained in the plate stock at the openings such that the plurality of fasteners provides threaded connection points that are employed in the further construction of the vehicle seat;
   performing a rolling operation to cause the first edge of the plate stock to come into close proximity with the second edge of the plate stock in such a manner as to form the desired cross-sectional shape for the rear crossmember;
   performing a welding operation to secure the first edge to the second edge thereby forming the rolled plate stock into the desired rear crossmember; and
   performing a striking operation upon the metal plate stock to provide a plurality of notches and openings in the rear crossmember, which are employed in the further construction of the vehicle seat.

2. The method as set forth in claim 1 wherein the step of providing metal plate stock further includes the steps of:
   providing metal plate stock as a portion of a continuous length of coiled metal stock;
   unrolling the continuous length of coiled metal stock before said step of performing a simultaneous punching and clinching operation; and
   cutting the continuous length of metal plate stock to provide the proper length rear crossmember.

3. The method as set forth in claim 2 wherein said step of cutting the continuous length of metal stock is performed prior to said simultaneous punching and clinching operation.

4. The method as set forth in claim 2 wherein said step of cutting the continuous length of metal stock is performed after said welding operation.

5. The method as set forth in claim 1 wherein the fasteners retained in the plate stock are female threaded connectors that are adapted to accept and receive male threaded fasteners that are inserted through the openings in the plate stock.

6. The method as set forth in claim 1 wherein the fasteners retained in the plate stock are male threaded connectors that are adapted to extend through the openings in the plate stock to accept female fasteners.

* * * * *